US005119111A

United States Patent [19]

Thomas et al.

[11] Patent Number: 5,119,111

[45] Date of Patent: Jun. 2, 1992

[54] EDGE-TYPE PRINTHEAD WITH CONTACT PADS

[75] Inventors: Lowell E. Thomas, Tewksbury; Luke R. Volpe, Jr., Melrose, both of Mass.

[73] Assignee: Dynamics Research Corporation, Wilmington, Mass.

[21] Appl. No.: 704,076

[22] Filed: May 22, 1991

[51] Int. Cl.[5] ........................ B41J 2/335; G01D 15/10; G01D 15/16

[52] U.S. Cl. ................................................ 346/76 PH

[58] Field of Search .................................... 346/76 PH

[56] References Cited

U.S. PATENT DOCUMENTS

| | | | |
|---|---|---|---|
| 3,161,457 | 12/1964 | Schroeder et al. | 346/76 |
| 3,210,624 | 10/1965 | Williams | 317/237 |
| 3,478,191 | 11/1969 | Johnson et al. | 219/216 |
| 3,578,946 | 5/1971 | Colello | 219/216 |
| 3,750,269 | 8/1973 | Small | 29/580 |
| 3,813,513 | 5/1974 | Vora et al. | 219/216 |
| 3,814,897 | 6/1974 | Otani et al. | 219/216 |
| 3,877,060 | 4/1975 | Shono et al. | 357/49 |
| 4,194,108 | 3/1980 | Nakajima et al. | 219/216 |
| 4,232,213 | 11/1980 | Taguchi et al. | 219/216 |
| 4,399,348 | 8/1983 | Bakewell | 219/216 |
| 4,533,921 | 8/1985 | Goff, Jr. et al. | 346/1.1 |
| 4,534,814 | 8/1985 | Volpe et al. | 156/300 |
| 4,636,811 | 1/1987 | Bakewell | 346/76 PH |
| 4,651,168 | 3/1987 | Terajima et al. | 346/76 PH |
| 4,684,960 | 8/1987 | Nishiwaki | 346/76 PH |
| 4,705,697 | 11/1987 | Nishiguchi et al. | 427/36 |
| 4,731,619 | 3/1988 | Miura et al. | 346/76 PH |
| 4,733,254 | 3/1988 | Yukihiro et al. | 346/140 R |
| 4,746,930 | 5/1988 | Shimazaki et al. | 346/76 PH |
| 4,774,527 | 9/1988 | Hancock et al. | 346/76 PH |
| 4,810,852 | 3/1989 | Bakewell | 219/216 |

FOREIGN PATENT DOCUMENTS

| | | | |
|---|---|---|---|
| 0039341 | 3/1980 | Japan | 346/76 PH |
| 62-161560 | 7/1987 | Japan . | |

*Primary Examiner*—Benjamin R. Fuller
*Assistant Examiner*—Huan Tran
*Attorney, Agent, or Firm*—Weingarten, Schurgin, Gagnebin & Hayes

[57] ABSTRACT

An edge-type printhead and method of fabricating the same, eliminates the need for precision grinding, lapping, and polishing of a substrate, avoids the need for precision etching of electrode patterns, avoids the use of highly refined etchable thick film pastes, and avoids the need for precision glaze application in the construction thereof. Contact pads are provided on the printhead writing surface. The contact pads facilitate accurately and inexpensively delineated resistor lengths, provide resistor current spreading for full dot width printing and control resistor row straightness. Contact pads permit the use of standard wet or chemical etching with wide spacing between electrodes while facilitating full width printed dots with narrow spacing. The contact pads are applied to the writing edge after the edge-type substrate is laminated, sectioned and the writing surface is polished.

8 Claims, 5 Drawing Sheets

EDGE-TYPE PRINTHEAD WITH CONTACT PADS

FIELD OF THE INVENTION

The present invention relates to edge-type thermal printheads and in particular to laminated edge-type thermal printheads.

BACKGROUND OF THE INVENTION

Thermal printheads are known which are laminated structures comprising an alumina substrate having alternating conductive and insulating layers (see for instance, U.S. Pat. No. 4,651,168 to Terajima et al.). Such prior art printheads, as illustrated in FIGS. 1A through 1E typically comprise an alumina substrate (10) having a metallic layer disposed thereon which may be patterned to provide a plurality of selectable electrodes (12). An insulating layer (14) of glaze is usually disposed upon the selectable electrodes (12) and subsequently has disposed thereon another metallic layer which provides a common electrode (16). A protective insulating material (17) may be disposed on the common electrode (16). The depth or amount of insulating glaze (14) disposed on the plurality of selectable electrodes (12) typically determines the length of heating elements or thin film resistors (18) disposed between respective selectable electrodes (12) and the common electrode (16).

Print quality is effectively a function of the resistors (18) and the characteristics of the insulative layer (14) upon which the resistors (18) are disposed. Certain characteristics of the resistors (18), such as the length determined by the insulative layer (14), significantly influence print quality, especially in long, high resolution printheads. Width of the resistors (18) is also a critical characteristic, because resistance value of a particular resistor is determined by first dividing the length of the resistor by its width to determine a number of "squares" of resistive material. The number of squares is then multiplied by the sheet resistance (Ohms per square) of the particular resistive material to determine the total resistance of each resistor. Total resistance determines the amount of heat generated for thermal printing. Thus, the length and width, i.e. resistance, of these resistors (18) must be accurately controlled to achieve high quality printing.

Ideally uniform print quality from resistor to resistor would require, as illustrated in FIG. 1A, an ideally uniformly planar substrate (10), perfectly regularly shaped selectable electrode (12) geometries, an ideally uniformly applied insulative layer (14), and an ideally uniformly planar second metallic or common electrode layer (16). However, as illustrated somewhat exaggeratedly in FIGS. 1B through 1E, various imperfections and irregularities occur in the fabrication of such laminated edge-type thermal printheads. Imperfections and irregularities effect resistor dimensioning, ultimately negatively impacting print quality.

Imperfections or unevenness in the alumina substrate (10), as illustrated in FIG. 1B, may be perpetuated throughout the various layers of the printhead. An uneven substrate (10) results in subsequently applied uneven and irregular selectable electrodes (12). Further, a similarly unevenly applied insulative glaze layer (14) will be disposed upon the electrodes (12) and substrate (10) and result in a correspondingly uneven common electrode layer (16).

Significantly costly mechanical processes may be undertaken, such as lapping and polishing of the substrate (10) to assure an even substrate (10), such as illustrated in FIG. 1C. However, lapping and polishing of the substrate (10) will not assure precision etched electrodes (12). Standard photolithographic techniques may not be adequate to uniformly meet the dimensional requirements of an electrode thickness in the order of 5 microns, necessary to achieve good electrical connection to the resistor and may result in irregularly shaped electrodes. Further, close spacings of electrodes (10–15 microns). necessary in high resolution (greater than 200 dpi) heads and required for complete electrode/resistor contact, are difficult to achieve with standard photolithographic techniques because of increased likelihood of bridging and shorting. The resulting electrodes, overetched to reduce the likelihood of shorts, may lack full resistor contact, such as illustrated in FIGS. 1C and 1D. Full dot width printing may be precluded because current from the electrode (12) will not spread adequately throughout the resistor to heat the entire resistor surface area. Thus, a precision etching technique, such as ion milling, would be necessary to make the widest possible electrodes with narrow spacing between them as required for high resolution heads.

However, precision etching techniques add additional and expensive processing steps and cannot absolutely preclude bridging and shorting between electrodes that may result never-the-less from lumpy, high granularity etchable thick film gold paste used in the electrode fabrication process. Greater precision and quality may require highly refined pastes.

Although precision ion milling of the selectable electrodes fabricated from highly refined pastes, permits greater control of the electrode geometry that can be fabricated on a precision ground or lapped substrate, resistor length and consequently print quality may still be negatively impacted by application of a non-uniform insulative glaze layer (14), such as illustrated in FIG. 1E. Elimination of imperfections in the insulative layer further requires surface finishing, such as precision grinding or lapping in order to avoid irregularities resulting from laminating the common electrode (16) on top of insulative layer (14) imperfections. Precision grinding or lapping of the insulative layer must also be highly controlled so as to avoid irregularities in the polished insulative layer, such as a wedged, uneven grinding as illustrated in FIG. 1F.

SUMMARY OF THE INVENTION

The present invention is an edge-type printhead and method of fabricating the same, which eliminates the need for precision grinding, lapping, and polishing of a substrate, avoids the need for precision etching of electrode patterns, avoids the use of highly refined etchable thick film pastes, and avoids the need for precision glaze application in the construction of a laminated thermal printhead.

According to the invention, contact pads are provided on a thermal printhead writing surface. The contact pads facilitate accurately and inexpensively delineated resistor lengths. The contact pads according to the invention provide resistor current spreading for full dot width printing and control resistor row straightness. Uniformity created by the contact pads results in substantially uniform thermal characteristics, which simplifies hysteresis control in smart heads. The contact pads according to the invention are applied to the writing edge after the edge-type substrate is laminated, sectioned and the writing surface is polished. High resolution (greater than 200 dpi) long thermal printheads are fabricated using standard thick film materials and processes, while contact pads applied with high resolution, .high accuracy thin film techniques are implemented on the writing surface to control accuracy and precision of the resistors for optimum print quality.

Features of the invention include the ability to use "as-fired" alumina substrates instead of precision lapped and polished substrates, resulting in a significant cost saving advantage. Contact pads according to the invention permit the use of relatively inexpensive standard wet or chemical etching with wide spacing between electrodes while facilitating full width printed dots with narrow spacing. Print dot row straightness is achieved. Stringent cleaning of precision lapped substrates and laminated layers is avoided.

DESCRIPTION OF THE DRAWING

These and other features and advantages of the present invention will become more apparent by reference to the following detailed description when considered in conjunction with the following drawing, of which.

DETAILED DESCRIPTION OF THE INVENTION

Figure 1A:
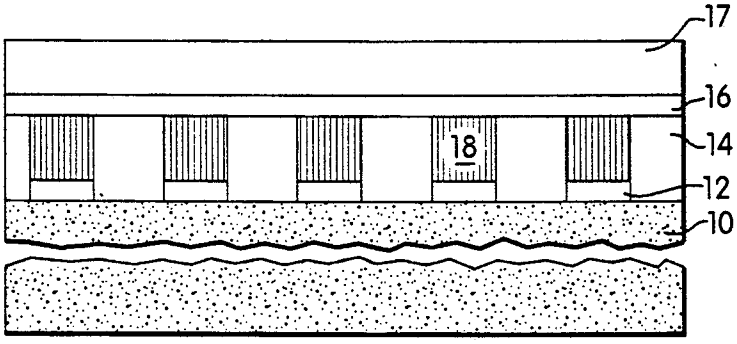
Fig. 1A (Prior Art)
FIG. 1A is an illustration of a writing edge on an ideal prior art edge-type thermal printhead.
Figure 1B:
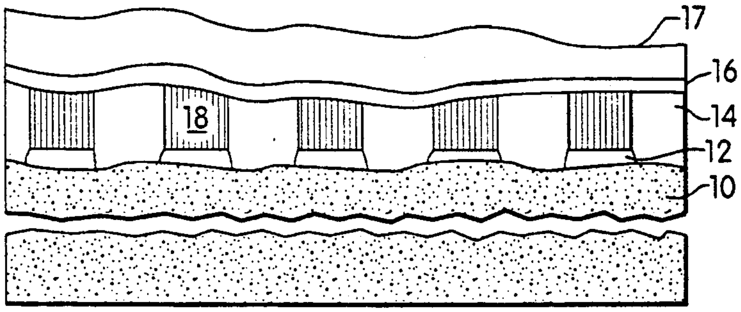
Fig. 1B (Prior Art)
FIGS. 1B, 1C, 1D, 1E and 1F are various views of writing surfaces of prior art laminated edge-type thermal printheads, having various deficiencies.
Figure 1C:
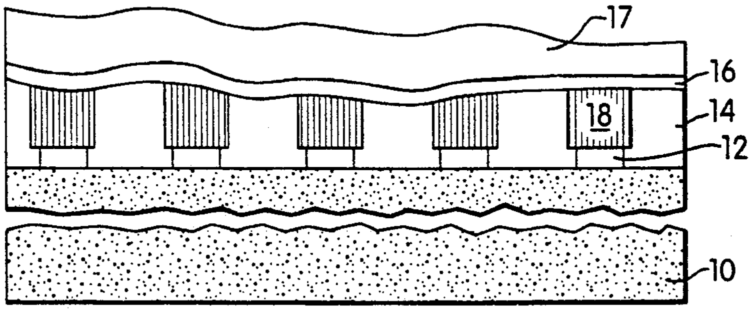
Fig. 1C (Prior Art)
Figure 1D:
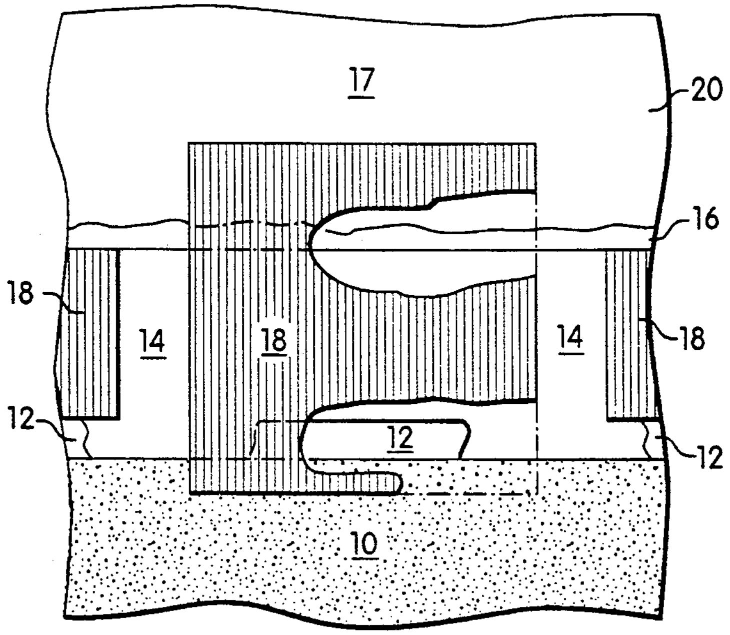
Fig. 1D (Prior Art)
Figure 1E:
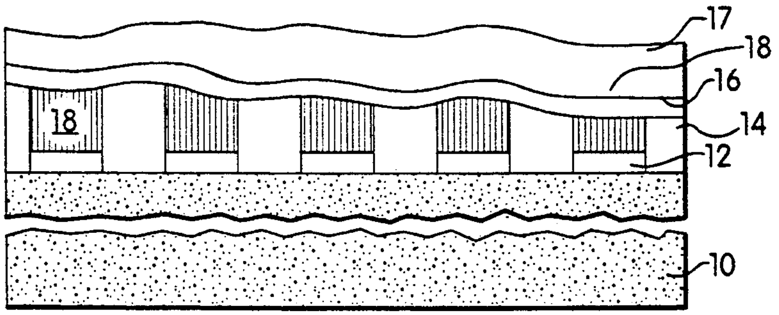
Fig. 1E (Prior Art)
Figure 1F:
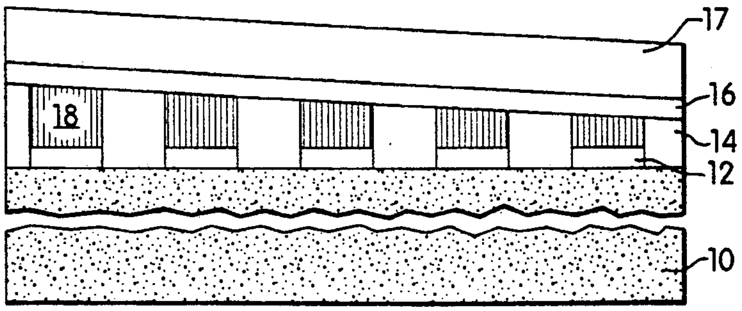
Fig. 1F (Prior Art)
Figure 2:
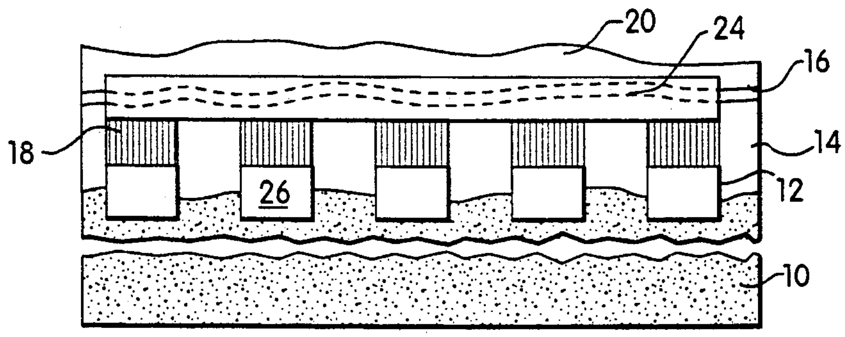
FIG. 2 is a writing surface according to the invention having contact pads delimiting resistor length.
Figure 4:
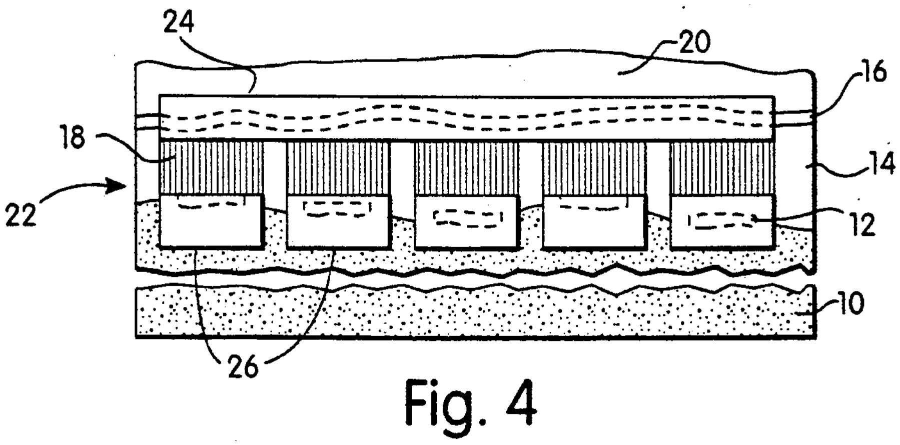
FIG. 4 is the writing surface of the edge type thermal printhead of FIG. 2 showing the irregularities of the electrodes in phantom covered by wide contact pads.

Referring now to FIG. 2 and 4, structure edge-type thermal printhead is constructed by laminating a first layer of metal onto an alumina substrate (10). Typically, the first metal layer is laminated as a conductive paste which is patterned and etched to form a plurality of selectable electrodes (12) as discussed hereinbefore with respect to the prior art. However, the first metal layer may also be deposited as a unitary conductive layer that will form a common electrode layer. Following the first metal layer, an insulative glaze layer (14), such as the Johnson Matthey JM300 or JM600 series of dielectric pastes for thermal printheads, or the like, is deposited on the first metal layer and fired. It is significant to note that according to the invention only minor consideration need be given to the planarity of the alumina substrate and the subsequently deposited glaze, because imperfections of the planar surfaces will be accommodated by the deposition of contact pads as discussed hereinafter. A second metal layer is deposited onto the insulative glaze (14). In this illustrative embodiment the second metal layer is deposited as a common electrode (16). A protective glaze layer (20) may be deposited over the common electrode as desired. The printhead, subsequent to constructing the various layers, is sectioned exposing a writing surface (22) complete with imperfections as discussed hereinbefore. The writing surface (22) is polished to prepare the writing surface for application of subsequently applied resistive elements (18), positioned between respective selectable electrodes (12) and the common electrode (16).

A printhead according to the present invention, further comprises a longitudinal contact pad (24) corresponding to and substantially aligned with the common electrode (16). A plurality of individual contact pads (26), correspond to respective individual selectable electrodes (12). The longitudinal contact pad (24) and the individual contact pads (26) are positioned so that the individual contact pads (26) are in a straight row and the longitudinal contact pad (24) is substantially parallel thereto. The contact pads are dimensioned to accommodate imperfections and can be of any dimension reasonable and practical for a particular application, as appreciated by one of ordinary skill in the art. The primary consideration is that the contact pads be dimensioned to define resistors with uniform length in a straight row.

Figure 3:
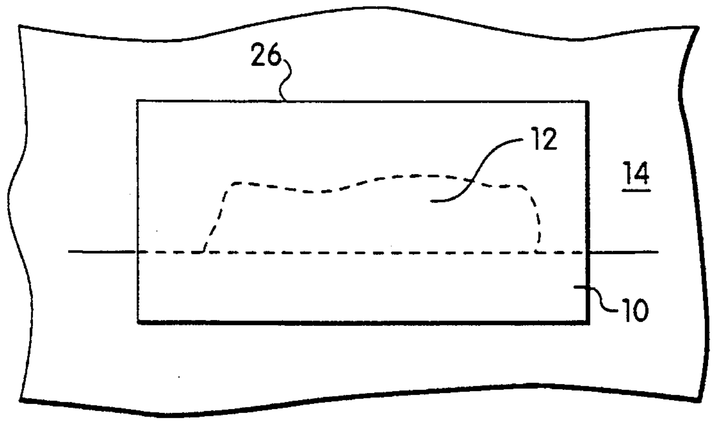
FIG. 3 is an enlarged view of an irregular shaped electrode with a superimposed contact pad.

As illustrated in FIGS. 4 and 3 selectable electrodes (12) and the common electrode (16), have an irregular edge caused by surface imperfections on the applicable laminae or introduced by the imprecision of the etching technique or due to the texture of the material used to form the metalization. While the irregularity is an undesirable condition, the longitudinal (24) and, individual (26) contact pads superimposed over the termination edge effectively emulate perfect electrodes. Application of resistors to the writing surface, with the contact pads in place results in the individual contact pads (26) acting as current spreaders dispersing current to promote full width dots and consequently higher quality, substantially more uniform print dots.

Figure 5:
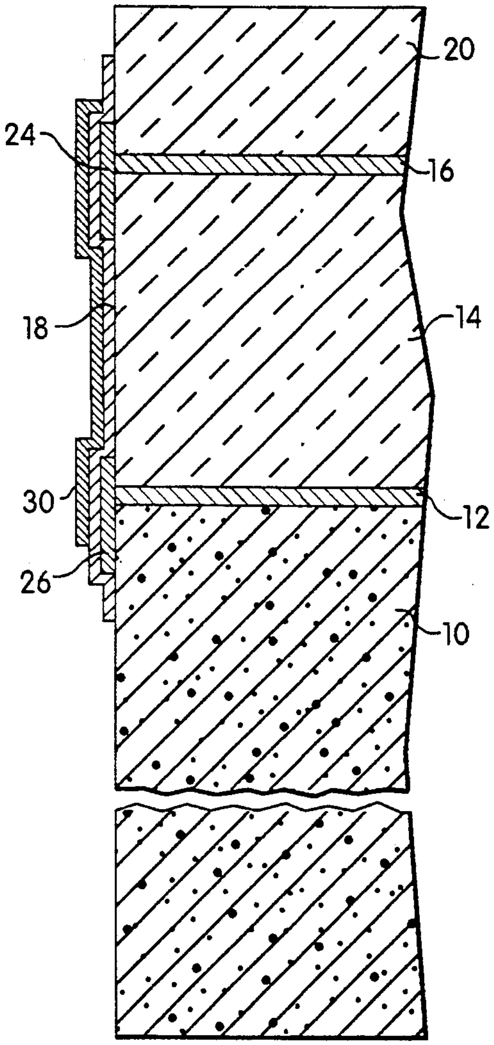
FIG. 5 is a side section view of the writing surface of the edge type thermal printhead of FIG. 2 having contact pads delimiting resistor length.

A cross-sectional view as shown in FIG. 5 illustrates the relationship of the contact pads vis-a-vis the resistor. The process of fabrication is illustrated in FIG. 6.

After the writing surface is sectioned (50), it is polished and cleaned. Subsequently, the individual and longitudinal contact pads are applied proximate to the respective underlying electrodes. Cleaning (60), to achieve intimate contact pad metal to electrode conductivity, involves an ion beam or sputter etch glow discharge process which removes surface contaminants and oxides prior to contact pad metal disposition. It should be noted that this cleaning step does not represent significant additional processing, as the same cleaning is necessary prior to resistor application in typical laminated structure edge-type printhead fabrication.

After cleaning (60), a contact pad metal is deposited on the appropriate Sites. preferrably, metals having high conductivities are used to facilitate current spreading. Refractory metals such as tungsten and molybdenum are preferred. Precious and semi-precious metals such as gold, palladium, ruthenium, platinum, rhodium or their alloys could be used, however, such metals do not adhere well and tend to flake when deposited directly on a substrate.

Figure 6:
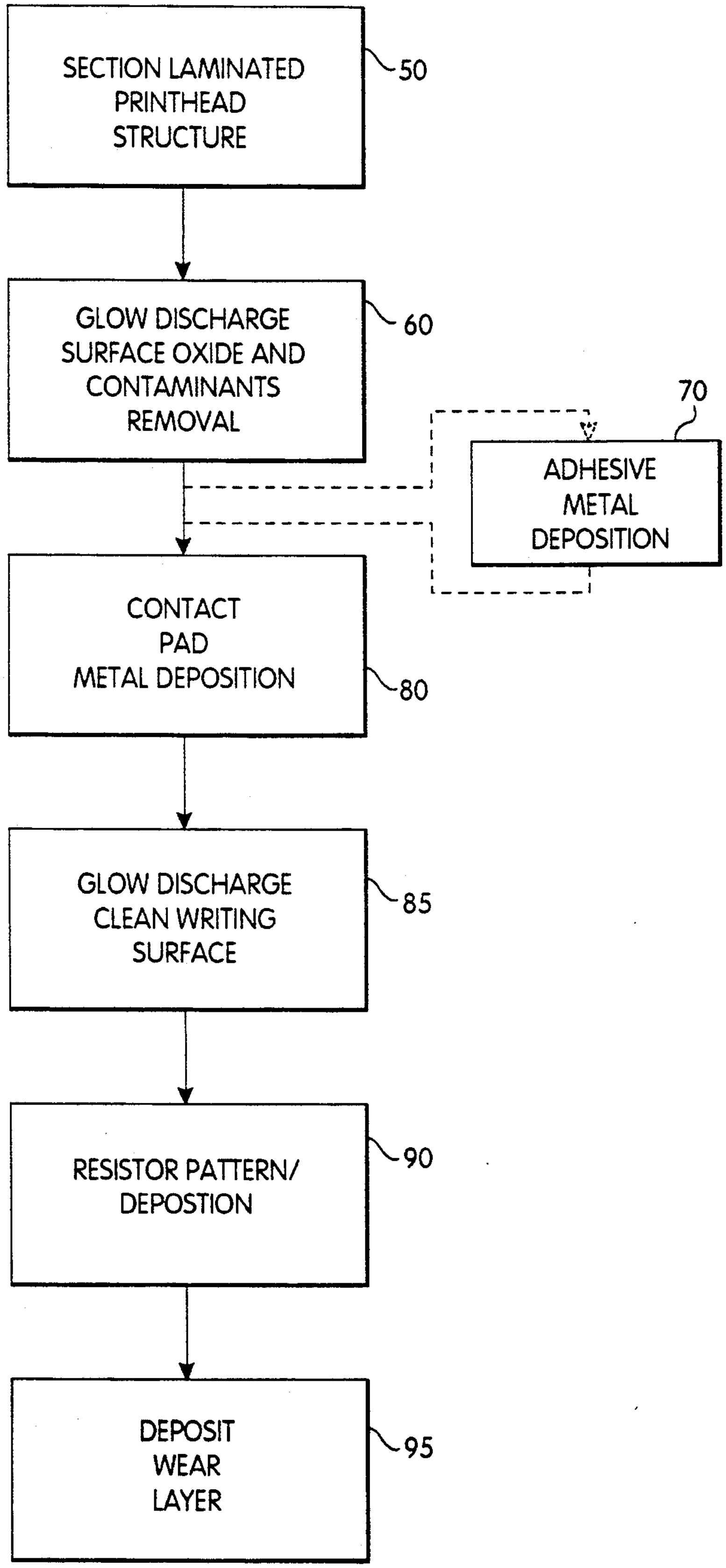
FIG. 6 is a flow diagram of a process of fabricating an edge-type thermal printhead according to the invention.

In the case where precious and semi-precious metals are to be used, an adhesive metal such as chromium or titanium-tungsten must first be deposited (70), illustrated in FIG. 6 as an optional step. The adhesive metal bonds tenaciously to the substrate and will readily bond with a subsequently applied precious or semi-Precious metal. However, adhesive metals tend to be relatively poor conductors, thus, their use is not preferred.

The contact pad metal is deposited (80), on the cleaned writing surface or optionally on the previously deposited adhesive metal, by a thin film process which effects electrical continuity with the underlying electrodes. The thin film process permits high accuracy deposition of the metal so that contact pads can be closely spaced to enhance the resolution of the printhead. Either subtractive etch processes or additive lift-off stenciling processes are suitable for sputtering or evaporation deposition of the selected metal in a vacuum system. Preferrably, a sputter deposition is performed to blanket metalize the contact pad area. The metal is then patterned for precision etching by ion beam milling. Chemical etching may be suitable depending upon the precision required by the application.

When the contact pads are in place, and prior to the resistors being applied (90), the writing surface is again cleaned (85) using a glow discharge cleaning process to remove contaminants.

Standard patterning and application techniques are used to put down the resistors on the writing surface subsequent to the contact pad deposition. A resistor material as known in the art, such as titanium silicide or tantalum carbide, is deposited in a thin film sputter deposition. The writing surface having the sputtered resistive material disposed thereon is then patterned and subjected to a subtractive etch process. Similar to the process of depositing the contact pads, the resistive element deposition can involve either ion beam milling of the patterned resistive material or a less precise chemical etch depending upon the degree of precision desired.

Optionally, and in most cases preferrably, a wear layer (30) is applied (95) over the resistive elements and contact pads. The wear layer must be a material which has high abrasion resistance and suitable thermal conductivity and shock resistance properties while functioning to prohibit oxidation of the resistive elements. Preferrably, tantalum pentoxide is sputter deposited over the resistors and contact pads to provide such a wear layer. Silicon nitride may also be suitable.

Although the illustrative embodiment disclosed herein describes the contact pads and resistors as being sputtered and etched, one of ordinary skill in the art can appreciate that the contact pads and and resistive elements can be deposited by patterning a resist and subsequently blanket depositing the contact pad or resistive elements and performing a lift off process removal of the resist so that the desired structures remain thereafter.

While the illustrative embodiment employed a first metal layer as selective electrodes and a second metal layer as a common electrode it will be appreciated that the first layer deposited could be the common layer with the selectable electrodes deposited thereafter. Further, a plurality of metal layers could be laminated to fabricate a printhead according to the invention having a plurality of rows of selectable electrodes and/or a plurality of common electrodes.

Although the invention has been shown and described with respect to an exemplary embodiment thereof, various other changes, omission and additions in the form and detail thereof may be made therein without departing from the spirit and scope of the invention.

What is claimed is:

1. A thermal printhead, comprising:
   - a substrate defining at least a first substrate surface and a second substrate surface;
   - a first metallic layer disposed on one of said at least said first substrate surface and said second substrate surface and having at least one meatallic end defining a first at least one metallic end being proximate to at least one of said at least said first substrate surface and said second substrate surface;
   - a second metallic layer having at least one metallic end defining a second at least one metallic end;
   - a first insulative layer disposed substantially between said first metallic layer and said second metallic layer, said first insulative layer having a first insulative surface;
   - at least two contact pads comprising a first contact pad and a second contact pad, said first contact pad contacting at least one of said first insulative surface, said first substrate surface and said second substrate surface and being electrically connected to said first at least one metallic end and said second contact pad contacting at least one of said first insulative surface, said first substrate surface and said second substrate surface and being electrically connected to said second at least one metallic end; and
   - at least one resistive element being in electrical contact with said first contact pad and said second contact pad.

2. The thermal printhead of claim 1 further comprising a second insulative layer disposed substantially on one of said first metallic layer and said second metallic layer.

3. The thermal printhead of claim 1 wherein one of said first metallic layer and said second metallic layer is patterned selectable electrodes and one of said first metallic layer and said second metallic layer is a common electrode.

4. The thermal printhead of claim 1 wherein said at least one resistive element is disposed on said first insulative surface.

5. The thermal printhead of claim 1 wherein at least one of said at least two contact pads comprises a first metal selected from the group consisting of tungsten and molybdenum.

6. The thermal printhead of claim 1 further comprising a protective layer deposited over said at least one resistive element and said first contact pad and said second contact pad.

7. The thermal printhead of claim 6 wherein said protective layer is a layer comprising material selected from the group of tantalum pentoxide and silicon nitride.

8. The thermal printhead of claim 1 wherein at least one of said at least tow contact pads comprises a second metal selected from the group consisting of gold, palladium, ruthenium, platinum and rhodium.

* * * * *